(12) United States Patent
Achten

(10) Patent No.: US 7,396,884 B2
(45) Date of Patent: Jul. 8, 2008

(54) HYDROGENATED NITRILE BUTADIENE RUBBER

(75) Inventor: Dirk Achten, Köln (DE)

(73) Assignee: LANXESS Deutschland GmbH, Leverkusen (DE)

( * ) Notice: Subject to any disclaimer, the term of this patent is extended or adjusted under 35 U.S.C. 154(b) by 362 days.

(21) Appl. No.: 10/778,429

(22) Filed: Feb. 13, 2004

(65) Prior Publication Data

US 2004/0166346 A1    Aug. 26, 2004

(30) Foreign Application Priority Data

Feb. 20, 2003    (DE) .............................. 103 07 137

(51) Int. Cl.
*C08C 19/04*    (2006.01)
*C08F 8/06*    (2006.01)

(52) U.S. Cl. .................... 525/387; 526/335; 526/341

(58) Field of Classification Search ................ 525/387; 526/335, 341

See application file for complete search history.

(56) References Cited

U.S. PATENT DOCUMENTS

| 4,826,721 | A | | 5/1989 | Obrecht et al. .............. 428/252 |
| 5,176,781 | A | * | 1/1993 | Mori et al. .................. 156/315 |
| 5,310,386 | A | * | 5/1994 | Mizuno et al. ............. 474/205 |
| 6,132,870 | A | * | 10/2000 | Halladay et al. ............ 428/373 |

FOREIGN PATENT DOCUMENTS

| EP | 0 864 607 | | 9/1998 |
| EP | 0 864 607 A1 | * | 9/1998 |
| EP | 1 195 403 | | 4/2002 |

OTHER PUBLICATIONS

Handbuch für die Gummiindustrie, 2nd Edition, Jun. 1991, p. 500, published by Bayer AG, "D 10.1 Cohedur".

* cited by examiner

*Primary Examiner*—Ling-Siu Choi
(74) *Attorney, Agent, or Firm*—Jennifer R. Seng

(57) ABSTRACT

The present invention relates to a composition containing a hydrogenated nitrile-butadiene rubber (HNBR), a peroxide crosslinking system and a resorcinol-formaldehyde resin, to a process for the preparation of the composition, to the use of the composition as an adhesion promoter, and also to a multilayer product containing the composition according to the present invention.

10 Claims, No Drawings

HYDROGENATED NITRILE BUTADIENE RUBBER

FIELD OF THE INVENTION

The present invention relates to a composition containing a hydrogenated nitrile-butadiene rubber (HNBR), a peroxide crosslinking system and a resorcinol-formaldehyde resin, to a process for the preparation of the HNBR composition, to the use of the HNBR composition as an adhesion promoter, and also to a multilayer product containing the composition according to the present invention.

BACKGROUND OF THE INVENTION

There is a great need for compositions which can be used as adhesive bases for untreated fabrics and reinforcing materials. Untreated fabrics and reinforcing materials are understood in this context as being fabrics and reinforcing materials that have not undergone special surface treatment for adhesion purposes, e.g. by means of coating processes from solution (impregnation processes) or using latex dips. The bond between the surface of the carrier material and the rubber must be sufficiently strong that it does not constitute the weak point in the composite system.

The direct reaction of the rubber with unpretreated carrier material and subsequent peroxide crosslinking is not known in the prior art. Analogous direct adhesion processes are only systems vulcanizable with sulfur, such as polychloroprene and nitrile rubber, described in Handbuch für die Gummiindustrie, 2nd Edition, 1991, p. 500, published by Bayer AG. The use of this process in peroxide vulcanized systems based on HNBR is not disclosed in the prior art.

In order to ensure good bonding of the actual rubber that is to be peroxide crosslinked to the carrier material, the latter must be pretreated. For the pretreatment, the carrier materials are treated, for example, with a latex or a solution, for the application of a so-called finishing layer. Such finishing layers contain several chemically different constituents. These generally consist of a rubber selected from the group consisting of polychloroprene, polyvinylpyridine, polybutadiene or polybutadiene copolymers, the copolymers being selected from the group consisting of acrylonitrile, styrene, or mixtures of those polymers. Furthermore, it is often appropriate to mix with the latex additional resins, such as resorcinol resins with hardeners such as formaldehyde (or formaldehyde donors) and optionally silane compounds. Such latices are referred to as RFL latex (resorcinol-formaldehyde latex).

The carrier material is immersed in the latex, dried and reacted fully, and then the actual rubber is vulcanized onto the carrier material so pretreated. Vulcanization can be carried out both with sulfur or sulfur systems and peroxide.

The fabrics impregnated with conventional latices based on polybutadiene or polybutadiene copolymers, polychloroprene or polyvinylpyridine exhibit distinct weaknesses, particularly after ageing, when peroxide crosslinked rubbers are used, which are employed in the next step of manufacture.

In order to improve the ageing properties, EP-B1 0 252 264 and U.S. Pat. No. 5,176,781 therefore disclose the use of latices based on partially hydrogenated HNBR and/or in combination with conventional latices with RFL systems.

For the production of the carrier materials so obtained and activated for adhesion to peroxide vulcanizable rubber mixtures, several successive dip cycles or immersion cycles are often necessary.

Accordingly, the present invention provides a composition which enables a HNBR rubber to be vulcanized directly onto the carrier material in question without having to pretreat the reinforcing material.

SUMMARY OF THE INVENTION

The present invention is directed to a composition containing
a) from 0.1 to 99.4 wt. % of a HNBR rubber,
b) from 0.1 to 20 wt. % of a peroxide crosslinking system and
c) from 0.5 to 40 wt. % of a resorcinol-formaldehyde resin.

DETAILED DESCRIPTION OF THE INVENTION

The HNBR rubber of the composition according to the present invention can have a nitrile group content of from 10 to 50 wt. %.

The composition according to the present invention can also contain further fillers and additives.

The composition according to the present invention can contain, in addition to the further fillers and additives, also from 0 to 40 wt. % of metal acrylates and/or methacrylates.

The present invention also provides a process for the preparation of the composition according to the present invention, wherein components a), b) and c) are mixed.

There is also provided a process for the production of a composite, wherein the composition according to the present invention is vulcanized with a carrier material.

In the process for the production of a composite, the carrier material can be in the form of a fabric or cord selected from the group consisting of polyamide, polyester, polyaramid, rayon or glass.

The present invention also provides a composite obtainable by vulcanization of the composition according to the present invention and the carrier material.

The composite obtainable by vulcanization of the composition according to the present invention and the carrier material can be selected from the group consisting of toothed belts, V-belts, conveyor belts, hoses, bags, membranes, tires, pneumatic springs and rubber muscles.

The composition according to the present invention contains from 0.1 to 99.4 wt. % of a HNBR rubber. Preference is given to from 20 to 70 wt. %, more preferably from 30 to 60 wt. %. The expression HNBR rubber is here to be understood as meaning simple HNBR rubbers as well as carboxylated HNBR rubbers (HXNBR) and also hydrogenated HNBR copolymers of butadiene, acrylonitrile and further acrylic or vinyl monomers. The HNBR rubbers are a highly hydrogenated nitrile-butadiene or nitrile-butadiene copolymer rubber. Highly hydrogenated is understood as meaning a content of double bonds in the HNBR rubber that is less than 40 double bonds per 1000 carbon atoms, preferably less than 15 per 1000 carbon atoms, more preferably in the range from 0.2 to 15 double bonds per 1000 carbon atoms. The HNBR rubber for the composition according to the present invention preferably has a nitrile group content in the range of from 10 to 50 wt. %, preferably in the range of from 15 to 39 wt. %, more preferably in the range of from 20 to 36 wt. %, based on the total content of the HNBR rubber.

The partial and/or complete hydrogenation of a NBR rubber is described in DE-A 2 539 132, DE-A 3 329 974, DE 3 056 008, DE-A 3 046 251, EP-A 111 412 and WO-A 01/77185. The HNBR rubber is prepared in solution, which is later converted into solid rubber.

The nitrile-butadiene rubber used to produce the HNBR rubber preferably has a random distribution of the monomer units. Suitable monomers for the production of the NBR rubber are all unsaturated monomers known to the person skilled in the art that are copolymerizable in emulsion with acrylonitrile and butadiene. Preference is given to copolymers based on acrylonitrile and butadiene and on acrylonitrile, butadiene, vinyl monomers and acrylate or methacrylate esters and their free acids.

Preferred unsaturated monomers for the copolymerization include vinylbenzenes such as styrene, divinylbenzene, methylstyrene, methacrylonitrile, acrylates such as methyl acrylate, ethyl acrylate, butyl acrylate, 2-ethylhexyl acrylate, and methacrylates, such as methyl methacrylate, ethyl methacrylate, butyl methacrylate, 2-ethylhexyl methacrylate and their free acids, acrylic acid, methacrylic acid, maleic anhydride, fumaric acid and itaconic acid.

The composition according to the present invention contains from 0.1 to 20 wt. %, preferably from 3 to 15 wt. %, of a peroxide crosslinking system. The peroxide crosslinking system contains a free-radical generator, preferably in combination with an activator. The proportion of activator in the crosslinking system as a whole is from 0 to 95 wt. %, preferably from 20 to 70 wt. %. The proportion of free-radical generator in the crosslinking system as a whole is in the range from 5 to 100 wt. %, preferably in the range from 30 to 80 wt. %. There may be used as activators, for example, triallyl isocyanurate and triallyl cyanurate, di- and tri-acrylates, cis-1,2-polybutadiene, m-N',N-phenylenedimaleimide and others. Preference is given to triallyl isocyanurate, triallyl cyanurate and trimethylol-propane trimethacrylate.

There are used as free-radical generators those compounds whose 10-hour half-life in benzene is over 80° C. Preference is given to peroxide free-radical generators, such as, for example, di-tert.-butyl peroxide, di-tert.-butylperoxyiso-propylbenzene, dibenzoyl peroxide, tert.-butylcumyl peroxide and others.

The composition according to the invention also contains from 0.5 to 40 wt. %, preferably from 3 to 15 wt. %, of a resorcinol-formaldehyde resin. The resorcinol-formaldehyde resin is a direct adhesive agent which can be obtained as the condensation product of phenol derivatives with formaldehyde and/or formaldehyde donors. Preferred resorcinol-formaldehyde resins include, for example, products such as Bondingagent R6® from Uniroyal, products from the product family Cohedur® and Vulkadur® from Bayer AG. Resorcinol is preferably used as the phenol or phenol derivative component. Compounds such as hexamethoxymethylmelamine are frequently used as the formaldehyde component. The resorcinol-formaldehyde system can be used either in the form of the individual components (e.g. Cohedur RL® from Bayer AG) or in precondensed form (e.g. Vulkadur T). The reactivity and the adhesion properties can be further influenced by the addition of suitable catalysts (silica such as e.g. Vulkasil A1® (semi-active precipitated aluminum sodium silicate, pH 10-12, surface area 60 m$^3$/g), Vulkasil N1® (active precipitated silica, pH 7, surface area 130 m$^3$/g) from Bayer AG). The composition according to the present invention can contain from 0 to 75 wt. % of further fillers and additives. These are preferably used in an amount of from 5 to 75 wt. %, more preferably in an amount of from 30 to 60 wt. %, based on the total composition of the composition according to the present invention. Fillers and additives are understood as being any fillers and additives known to the person skilled in the art which are used in the field of vulcanized rubber composites and described in Handbuch für die Gummiindustrie, 2nd Edition, 1991, published by Bayer AG. Preference is given to carbon black, silica, inorganic oxides, stabilizers, plasticizers, processing aids, anti-ageing agents.

From 0 to 40 wt. %, preferably from 5 to 30 wt. %, based on the total composition of the composition according to the present invention, of further metal acrylates and/or methacrylates are preferably added to the composition according to the invention. Preferred metal (meth)acrylates are zinc diacrylates and zinc dimethacrylates.

For the preparation of the composition according to the present invention, components a), b) and c) are mixed together. Apparatuses known to the person skilled in the art, such as internal mixers and rollers, are used for the mixing. The preparation of the mixture is carried out at temperatures known to the person skilled in the art. A temperature range of from 40 to 140° C. is preferred.

The present invention also provides a process for the production of a composite from a carrier material and the composition according to the present invention.

The carrier material is understood as being any fabrics and cords that are composed of a fiber material. The fiber material is selected from the group consisting of cotton, rayon, polyamide fibers such as polycaprolactam, poly(decamethylenecarboxamide) poly(hexamethyleneadipamide and others), polyaramid fibers (poly(m)-phenyleneisophthalamide), poly(p)-phenyleneisophthalamide and others), polyester fibers such as polyethylene terephthalate, polybutylene terephthalate, poly(cyclohexane 1,4-dimethylene terephthalate and others, glass fibers, steel cord. Preference is given to fiber materials composed from the group consisting of polyamide, polyester, polyaramid, rayon and glass.

For the production of such composites, the composition according to the present invention is vulcanized with the carrier material at temperatures in the range of from 120 to 220° C., preferably from 150 to 200° C., and at a pressure of from 0.5 to 50 bar, preferably in the range of from 2 to 20 bar. The vulcanization is carried out in presses known to the person skilled in the art, which determine the shape of the composite that is obtained.

There can be produced a composite selected from the group consisting of tires, conveyor belts, belts of all kinds, such as toothed belts, V-belts, reinforced hoses, such as fire-extinguishing hoses, rubberized fabrics, pneumatic springs and rubber muscles.

The composites so obtained are distinguished by good adhesion between the carrier material and the rubber even on ageing. The resulting composites have good resistance to heat and oil and good mechanical properties, such as tensile strength and elongation at break. These composites have the advantage over conventional composites that they are simple, more rapid and more economical to produce, because an expensive dipping process for pretreating the carrier material is unnecessary.

EXAMPLES

Comparison mixtures not in accordance with the invention and comparison examples resulting therefrom are marked with #.

TABLE 1

Recipe for different formulations for use as an adhesive mixture for reinforcing materials. The constituents of the mixture are given in parts based on the total amount of HNBR rubber (Therban) used.

| Constituents of the mixture | 1 | 2 | 3 | 4 | 5 | 6 | 7 | 8# | 9# |
|---|---|---|---|---|---|---|---|---|---|
| Therban VP KA 8889[1] | 100 | 100 | — | 10 | 10 | 10 | 10 | — | 10 |
| Therban C3446[2] | — | — | 100 | 90 | 90 | 90 | 90 | 100 | 90 |
| Rhenofit DDA-70[3] | 2 | 2 | 2 | 2 | 2 | 2 | 2 | 2 | 2 |
| Corax N 550[4] | 30 | 30 | 30 | 30 | 30 | 30 | 30 | 30 | 30 |
| Cohedur RL[5] | 15 | 15 | 15 | 5 | 10 | 15 | 5 | — | — |
| Sartomer SR 633[6] | — | — | — | — | — | — | 30 | — | — |
| Struktol ZP1014[7] | 6 | 6 | — | — | — | — | — | — | — |
| Aluminum stearate[8] | — | 4 | — | — | — | — | — | — | — |
| Stearic acid[9] | — | 1.5 | 1 | — | — | — | — | — | — |
| PERKADOX 14–40 B-gr[10] | — | — | 4 | 5 | 5 | 5 | 5 | 5 | 5 |

Therban VPKA 8889[1] from Bayer (hydrogenated acrylonitrile-butadiene-methacrylic acid terpolymer (HXNBR))
Therban C3446[2] from Bayer (hydrogenated acrylonitrile-butadiene copolymer (HNBR))
Rhenofit DDA-70[3] from Rheinchemie (70% diphenylamine derivative (dry-liquid))
Corax N 550[4] carbon black, FEF fast extruding furnace from Degussa
Cohedur RL[5] 45.5% resorcinol, 45.5% Cohedur A 700, 9% dibutyl phthalate from Bayer
Sartomer Saret S633[6] from Cray, metal diacrylate with added retarding agent
Struktol ZP 1014[7] from Schill+Seilacher, zinc peroxide approx. 55% dust-free zinc peroxide provided with dispersant, accelerator for XNBR and HNBR vulcanization
Aluminum stearate[8] from Riedel de Haen AG
Tefacid RG[9] from Tefac (stearic acid)
Perkadox 14-40 B-gr[10] DI-(TERT.-BUTYL-PEROXY-ISO-PROPYL)-benzene 40% from Akzo-Nobel For the preparation of the mixture, the constituents are mixed on a mixing roller in the following sequence: rubber, carbon black, zinc diacrylate, stabilizers, peroxide and processing aids. The roller has a temperature of 60° C.

TABLE 2

Results of physical tests of the properties of the mixtures prior to vulcanization

| | Mixture | | | | | | | | |
|---|---|---|---|---|---|---|---|---|---|
| | 1 | 2 | 3 | 4 | 5 | 6 | 7 | 8# | 9# |
| Start of vulcanization According to DIN 53523 TS 5/120° C. (min) | 47.6 | 8.8 | >50 | >50 | >50 | >50 | >50 | >50 | >50 |

TABLE 3

Results of physical tests of the properties of the vulcanite's of the composition without reinforcing materials at room temperature. Vulcanization was carried out at 180° C. for 20 minutes at 30 bar.

| Tensile test according to DIN 53504 | Mixture | | | | | | | | |
|---|---|---|---|---|---|---|---|---|---|
| | 1 | 2 | 3 | 4 | 5 | 6 | 7 | 8# | 9# |
| Tensile strength (MPa) | 28.8 | 32 | 23 | 23.7 | 21.9 | 20.7 | 27.9 | 28 | 27.2 |
| Elongation at break (%) | 221 | 265 | 517 | 489 | 468 | 461 | 290 | 507 | 519 |
| Modulus at 50% elongation (MPa) | 5.3 | 5.0 | 1.4 | 1.2 | 1.3 | 1.4 | 4.8 | 1.2 | 1.2 |
| Modulus at 100% elongation (MPa) | 12.1 | 11 | 2 | 1.9 | 2.1 | 2.1 | 10.1 | 1.8 | 1.9 |
| Modulus at 200% elongation (MPa) | 26.5 | 26 | 5.4 | 5.8 | 6.5 | 6.2 | 21.8 | 5.6 | 5.7 |
| Modulus at 300% elongation (MPa) | — | — | 10.8 | 12.2 | 12.8 | 12.3 | — | 12.1 | 11.9 |
| Tear strength according to DIN 53515 (N) | | | 12.6 | 13.5 | 13.2 | 17.1 | 11.8 | 12.7 | |
| Hardness measurement (3 × 2 mm rod) according to DIN 53505 (Shore A) | 82 | 82 | 63 | 60 | 61 | 63 | 84 | 59 | 59 |

TABLE 4

Results of the tests of adhesion to various textile fabrics. The peel strength was determined at 23° C. according to DIN 53530 at a take-off speed of 100 mm/min. The peel strengths of mixtures 1 to 9 from a polyamide fabric, from the same polyamide fabric coated with commercial HNBR-RFL latex and from a rayon fabric were tested on the peel test specimens described in DIN 53530. The specimens were vulcanized at 180° C. for 30 minutes at 30 bar.

| | Mixture | | | | | | | | |
|---|---|---|---|---|---|---|---|---|---|
| | 1 | 2 | 3 | 4 | 5 | 6 | 7 | 8# | 9# |
| | Peel strength | | | | | | | | |
| | N/25 mm | | | | | N/10 mm | | | |
| Polyamide fabric Untreated | 157* | 220* | 384* | 125* | 126* | 110* | 61** | 8** | 5** |
| Polyamide fabric coated with RFL-HNBR | 13.4** | 17.8** | 94** | | | | | | |
| Rayon fabric Untreated | | | | 43** | 49** | 50** | 25** | 25** | 26** |

*breakage of the rubber
**breakage at the point of transition between the fabric and the mixture Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition consisting essentially of
   a) from 0.1 to 98.4 wt. % of a HNBR rubber having a nitrile group content of from 10 to 50 wt. %
   b) from 0.1 to 20 wt. % of a peroxide crosslinking system and
   c) from 0.5 to 40 wt. % of a resorcinol-formaldehyde resin,
   d) optionally, filler and additives and from 0 to 40 wt. % of metal acrylates and/or methacrylates.

2. The composition according to claim 1, containing from 20 to 70 wt. % of a HNBR rubber.

3. The composition according to claim 1, containing from 30 to 60 wt. % of a HNBR rubber.

4. The composition according to claim 1, containing from 30 to 15 wt. % of a peroxide crosslinking system.

5. The composition according to claim 1, containing from 3 to 15 wt. % of a resorcinol-formaldehyde resin.

6. Process for the preparation of the composition according claim 1, comprising mixing components a), b) and c).

7. Composite prepared by vulcanizing the composition according to claim 1 and a carrier material.

8. The composite according to claim 7, wherein the composite is selected from the group consisting of toothed belts, V-belts, conveyor belts, coated fabrics, hoses, bags, tires, pneumatic springs and rubber muscles.

9. Process for the production of a composite comprising vulcanizing the the composition according to claim 1 with a carrier material.

10. The process according to claim 9, wherein the carrier material is selected from the group consisting of polyamide, polyester, polyaramid, rayon and glass.

* * * * *